United States Patent [19]

Trant

[11] Patent Number: 5,495,882

[45] Date of Patent: Mar. 5, 1996

[54] TIRE DERIMMING MACHINE

[75] Inventor: Carl A. Trant, Palmer, Mass.

[73] Assignee: Tire Recycling and Development, Inc., Palmer, Mass.

[21] Appl. No.: 269,489

[22] Filed: Jul. 1, 1994

[51] Int. Cl.⁶ .................................................. B60C 25/07
[52] U.S. Cl. .......................... 157/1.21; 72/402; 100/232
[58] Field of Search .................................. 100/35, 269 R, 100/232; 157/1.2, 1.21; 72/402

[56] References Cited

U.S. PATENT DOCUMENTS

| | | |
|---|---|---|
| 2,464,092 | 3/1949 | Kroll et al. . |
| 2,907,379 | 10/1959 | Tuttle . |
| 4,080,887 | 3/1978 | Larsen . |
| 4,083,394 | 4/1978 | Heikkinen et al. . |
| 4,306,606 | 12/1981 | Grasso . |
| 4,804,031 | 2/1989 | Rouse et al. . |
| 4,945,968 | 8/1990 | Bradburn . |

*Primary Examiner*—James G. Smith
*Attorney, Agent, or Firm*—Fishman, Dionne & Cantor

[57] ABSTRACT

A tire derimming apparatus is disclosed having one ram for forcing a tire and rim combination through a restricted opening. Tires exiting the restricted opening are disconnected from the rim on which they were mounted. The apparatus further comprises a feeding arrangement which ensures that one tire and wheel combination at a time enters the derimming section.

22 Claims, 4 Drawing Sheets

TIRE DERIMMING MACHINE

BACKGROUND OF THE INVENTION

1. Field of the Invention

The invention relates to an apparatus for quickly and effectively derimming old tires for recycling purposes.

2. Prior Art

Prior to the development of the apparatus disclosed herein, tire derimming machines utilized multiple rams to forcibly deform a wheel so that it could be removed from a tire. These systems generally require at least 2 people to operate and are capable of derimming relatively few tires a day. These machines are not cost effective since the salaries of two workers are required, automatic feeds are not available and the output of derimmed tires is unacceptably low. For many years now, however, junk yards and recycling centers have been using these derimmers because other options did not exist.

A further drawback of the prior art is that the machines are expensive, and because of the numerous parts, the are prone to breakage.

Therefore, a strong need exists for a more efficient and cost effective tire derimming machine, especially in view of the increasing global trend toward recycling.

SUMMARY OF THE INVENTION

The above-discussed and other drawbacks and deficiencies of the prior art are overcome or alleviated by the tire derimming machine of the invention.

The tire derimming machine includes a single ram and :pusher head for forcibly urging a tire and rim combination through a decreasing width channel or mandrel such that the rim or wheel is sufficiently reduced in outside dimension to be easily releasable from the tire with which it had previously been mated.

In order to feed the ram, pusher head and mandrel arrangement with one tire and wheel combination at a time, a feeder rack is constructed above a feeder plate. The rack will accept tires of varying dimensions depending upon its size. A thirty inch rack will feed 13, 14 and 15 inch rims with tires mounted .thereon, other feeder rack diameters can be tailored to fit other size tire/rim combinations.

It is important to recognize that the movements of the single ram not only reduce outer dimension of the wheel/tire combination inserted in the machine but also governs the movement of the automatic feeding mechanism; therefore, there are fewer parts that can malfunction.

Once the ram and pusher head have reduced the dimensions of the wheel, the wheel and tire combination fall onto a shaker table which cycles up and down at relatively high frequency so that the wheel is shaken free from the tire. Conveyers could then be used to carry the separated pieces away.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

The tire derimming machine of the present invention is prefaced on the concept of a single ram, the movement of which is responsible for reduction of outer dimension of wheels so that tires can be easily removed therefrom and additionally for movements of the automatic feeding arrangement. Tires are then removed from the bent rim by being shaken on a shaker table actuated by a separate means. Referring to all of the FIGURES simultaneously, the ram includes a pusher head 1 fixedly attached to a shaft 5 which is received in and actuated by a cylinder 7. Cylinder 7 can be a fluid pressure system or could alternatively be a rotating screw drive but is most preferably a hydraulic cylinder capable of producing at least 35 tons of pressure. The cylinder 7 is mounted, preferably pivotally, onto the machine frame 10 by suitable means.

Frame 10 provides support for the machine and all moving pans. Frame 10 preferably comprises a pair of I-Beam skids to which steel plate is fastened. The steel plate generally is fastened in an elongated configuration most preferably in a rectangle. The ram is located at one end of the rectangle with the pusher head 1 extending into the working area defined by the rectangular shape of the frame 10. Frame 10 extends axially providing several support surfaces on which various pans of the machine ride.

Figure 3:
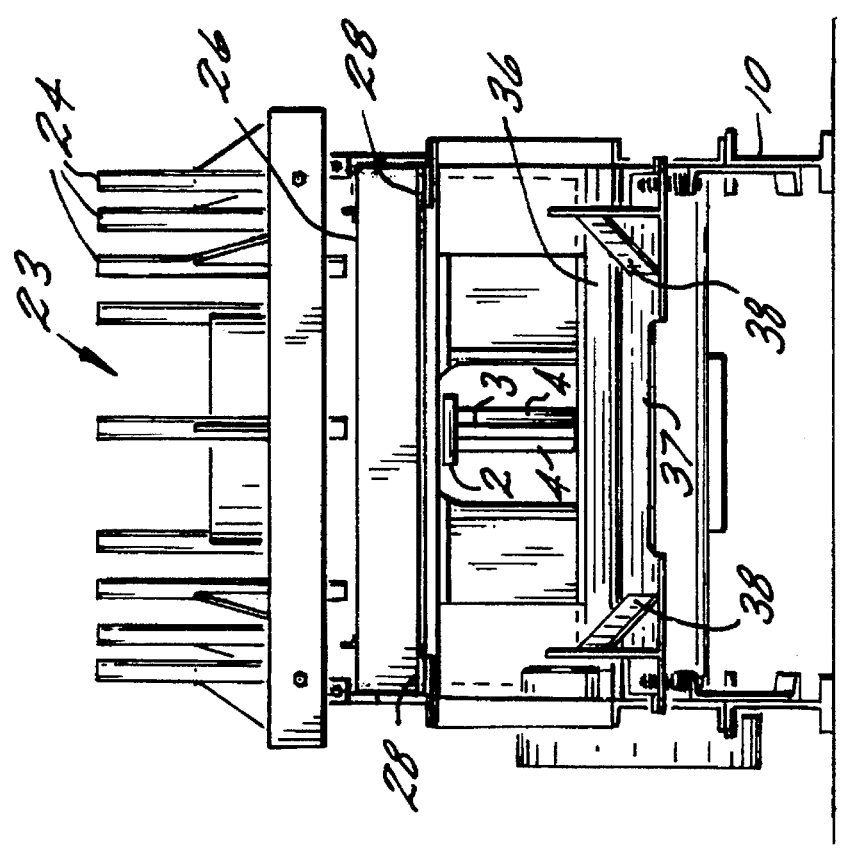
FIG. 3 is an end elevation view of the invention.
Figure 6:
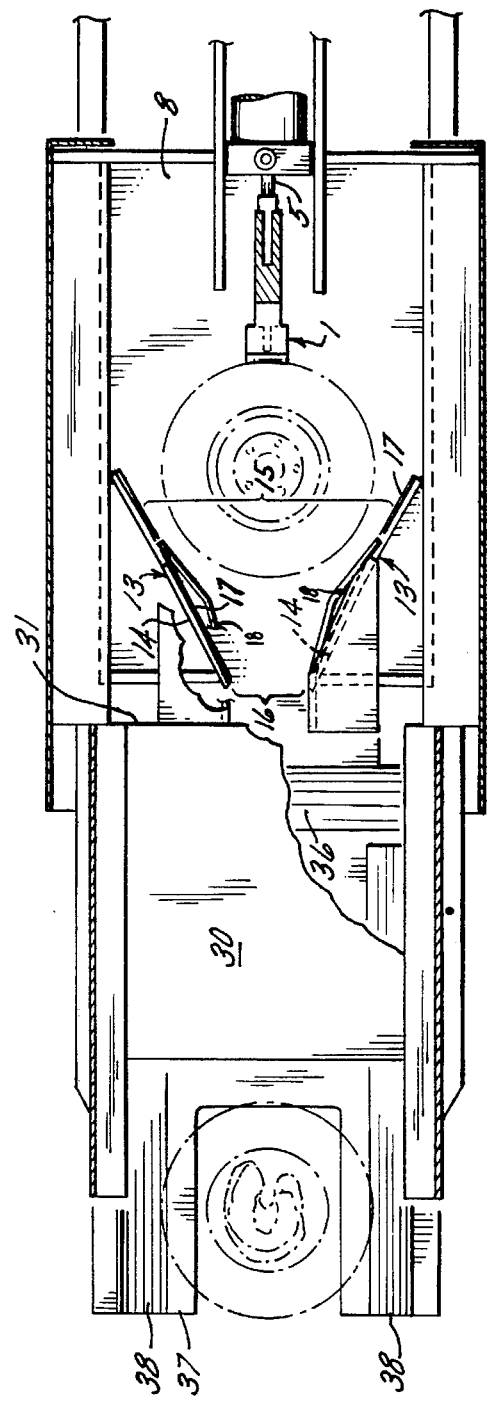
FIG. 6 is a cross section view of the machine taken along section line 6—6 in FIG. 3.

Referring to FIGS. 3 and 6 the pusher head 1 comprises a relatively horizontal cap 2 and a relatively vertical blade 3 which are fixedly attached to a shaft connection with lip 4. Blade 3 creates a deep narrow fold in a wheel being distorted whereas lip 4 is necessary for assisting in pushing the wheel through mandrel 13. In the absence of lip 4, blade 3 would tend to push through the wheel rather than push the wheel through mandrel 13. This is undesirable since the pusher head 1 would not reliably release the tire from the rim and eject the rim from the pusher head 1/mandrel 13 area.

Pusher head 1 is mounted in a cross brace 20 to provide stability under forces of great magnitude generated by the cylinder 7. Cross brace 20 preferably slides along a track on a roller bearing or suitable lubricant. As cross brace 20 and pusher head 1 move inwardly a tire placed in the work area defined by frame 10 is urged against mandrel 13.

Mandrel 13 is an angular structure including support plates 14 which both taper and incline. Mandrel 13 is tapered from the mouth 15 to tunnel 16; a range of from about 20° to about 70° with a most preferred range being from about 30° to about 50°, where the angle is measured from a plan view centerline of the machine. The tapered support plates 14 work with pusher head 1 to reduce the outside dimension of a wheel. The angle itself helping to reduce the maximum force needed to force a tire and wheel combination through a hole having dimensions substantially smaller than the original dimensions of the tire and wheel. Advantageously it should be noted that the wheel rides on the compressed rubber of the tire as it is urged through mandrel 13. This is beneficial both because it helps quiet operation and reduces wear of the machine. Although wear is reduced, it is still desirable to provide replaceable wear plates 17 over support plates 14 for increased longevity of the machine.

As stated above, the plates 14 of the mandrel 13 are also inclined. More specifically, each support plate 14 is closer at the top than it is at the bottom. It has been found that this arrangement is extremely important to the invention since if the plates are not so inclined, the rim bends in such a manner that the tire is pinched in a metal fold and will not release therefrom. This, of course, would defeat the purpose of the invention. The angle of inclination is preferably from about 1° to about 10° and most preferably about 4° to about 6°. It has been found that tires are reliably :released from rims with this arrangement.

Mandrel 13 also includes hold-down bars 18 positioned atop mandrel 13 to aid in preventing a tire/wheel combination from "popping" upward when being urged through mandrel 13.

In order to mechanically feed the pusher head 1 and mandrel 13 part of the machine a feeder rack 23 and feeder plate 26 arrangement is provided.

Feeder rack 23 comprises an upright tubular structure for receiving a stack of tires, mounted on wheels, of varying outside dimension. The tubular structure of feeder rack 23 could be solid or otherwise. In one preferred embodiment the feeder rack 23 consists of a hole cut in a plate and a plurality of upwardly extending members 24, such as bars, rods, fingers, studs, pillars, etc. disposed in a generally cylindrical arrangement. It is most preferred to utilize the plurality of upwardly extending members 24 since friction against a tire and wheel combination placed therein is effectively reduced. This is beneficial to the operation of the feeder rack 23 since tires necessarily get "hung-up" less frequently where there is less friction.

Figure 4:
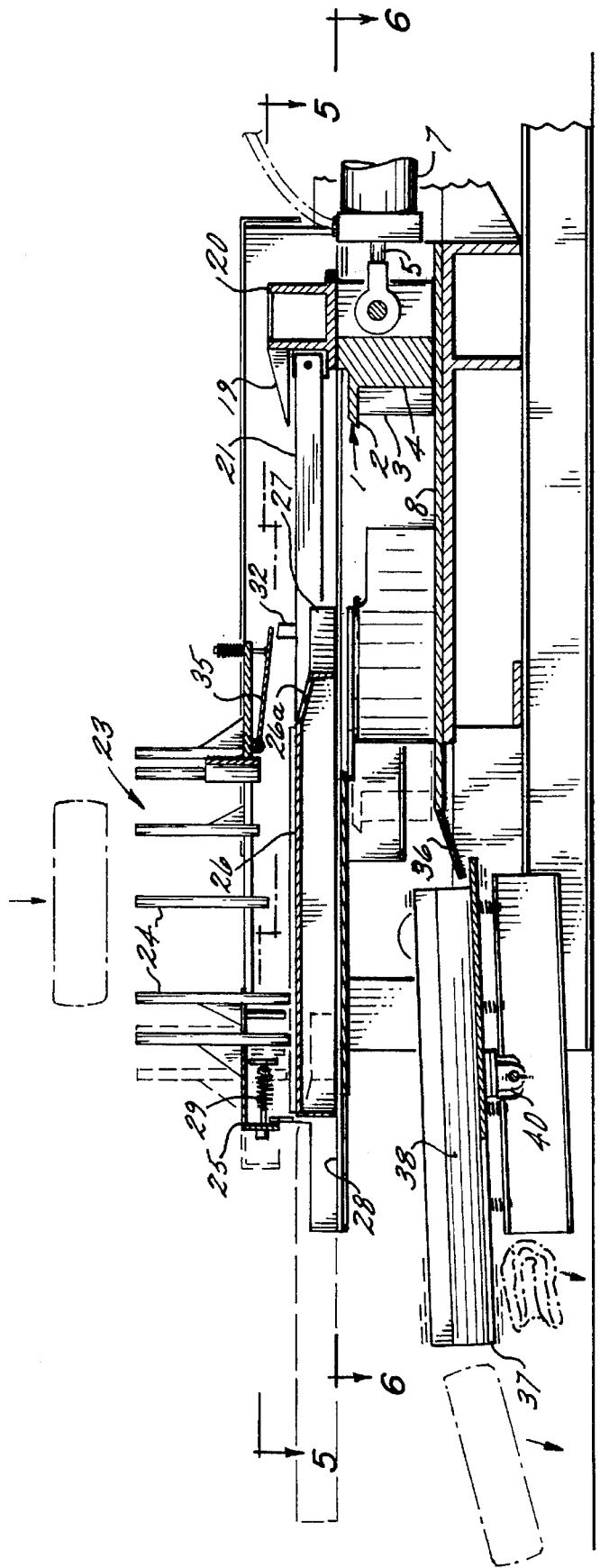
FIG. 4 is a cross section view of the machine taken along section line 4—4 in FIG. 1.
Figure 5:
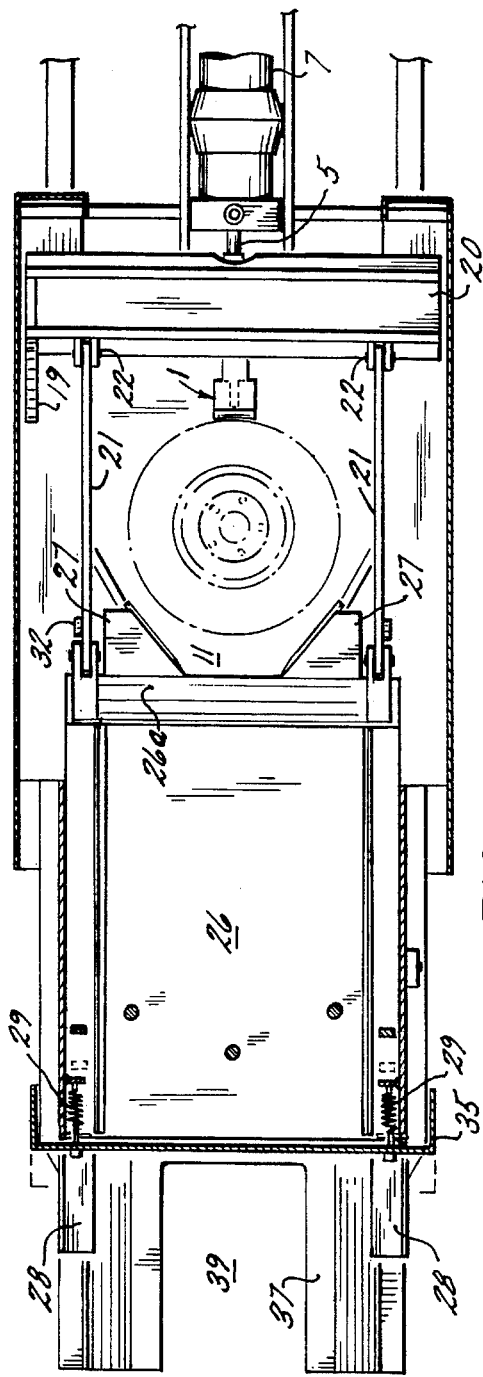
FIG. 5 is a cross section view of the machine taken along section line 5—5 in FIG. 1.

Operating in concert with the feeder rack 23 is feeder plate 26 (best illustrated in FIGS. 4 and 5) which cycles back and forth riding on rails 28 mounted in Frame 10. The feeder plate 26 may simply slide on rails 28 with a lubricant or may ride on rails 28 on rollers to help reduce wear to increase service life. As feeder plate 26 cycles it accepts a single tire and rim combination at a time and transports the combination to the size reduction zone 11 defined by the mandrel 13, pusher head 1 and frame 10. Feeder plate 26 is preferably operatively connected to cross brace 20 through extension arms 21 so that as pusher head 1 and cross brace 20 are move longitudinally along frame 10, feeder plate 26 is moved longitudinally in the same direction. Extension arms 21 are attached via any fastening means however are most preferably mounted on pins 22. When pusher head 1 and cross brace 20 are retracted by shaft 5 and cylinder 7, feeder plate 26, having allowed one tire and wheel combination to drop into the injection area 30 (FIG. 6), moves back toward the cylinder 7 end of the apparatus. When feeder plate 26 reaches the starting point of its cycle, the tire and wheel combination, which has been loaded into the injection area 30, drops into size reduction zone 11. It is important to note now, if it has not yet become apparent, that feeder plate 26 cycles on a level of frame 10 which is slightly higher than the width of a tire and which combination from lower plate 8 (FIG. 4). Thus, when a tire and wheel combination is transferred from injection area 30 to size reduction zone 11, the tire/wheel combination drops a distance slightly larger than the overall width of the combination.

While the transfer generally occurs without difficulty it has been found that smaller wheel sizes sometimes do not load properly but stand up in the size reduction zone 11. A standing wheel, of course, cannot be pushed though mandrel 13; the machine would need to be shut down so an attendant could manually reorient the wheel. This costs time and manpower which is undesirable.

To prevent the occurrence of a wheel standing up, an orientation plate 35 (FIG. 4) is pivotally mounted in the frame 10. Orientation plate 35 hangs down, from the upper section of frame 10, toward the size reduction zone 11. Therefore, when a tire is being transported from the injection area 30 to size reduction zone 11, orientation plate 35 is lifted by the passing tire and wheel combination; the weight of orientation plate 35 on the tire and wheel combination is sufficient to retain the tire in a horizontal orientation until it falls into size reduction zone 11. This arrangement effectively prevents smaller tires standing up. As can be ascertained from FIG. 4, one edge of orientation plate 35 hangs below the top edge of cross brace 20. This would interfere with operation of the machine if not for means for lifting orientation plate 35 at a predetermined time. Lifting wedge 19 in the preferred embodiment is fixedly attached to cross brace 20 to lift orientation plate 35 a sufficient amount to clear cross brace 20.

Injection area 30 is constructed of a slide plate 31 on which a tire and wheel combination land when feeder plate 26 is cycled out from under the stack of tires in feeder rack 23 and the feeder plate 26. Slide plate 31 is preferably generally rectangular, but includes a fork like shape at the end closest the mandrel 13. The fork shape approximates the shape of mandrel 13 which is located immediately thereunder. This is illustrated in FIG. 6. The same end also contains a channel cut therein to allow passage to and fro of the cap 2 of pusher head 1. Slide plate 31 functions to support a tire and wheel combination while it is being pushed by feeder plate 26 through injection area 30 to size reduction zone 11.

Feeder plate 26 itself comprises a unique configuration which is particularly suited to accepting and positioning tires and wheels for correct and error free transport to the size reducing zone 11. The front end of feeder plate 26 has a plan view shape generally approximating one half of a hexagon. As opposed to a very complex description of the shape, reference is made to FIG. 5 wherein the shape can be easily understood by those of skill in the art. As is observable in FIG. 4 the furthest forward portions of the feeder plate are about one-half as tall as the main body of the plate. Additionally, the full height of the plate, 8 inches in the most preferred embodiment, is only gradually reached. This can be seen in FIG. 4 and in plan view in FIG. 5, wherein an angled surface 26a extending from the level of the lower tips 27 of feeder plate 26 to the full height of feeder plate 26. The, angle 26a of inclination of is in the range of about 14° to about 24°, with a most preferred angle of about 19°. These angles are preferred but not necessary to the operation of the invention.

Figure 1:
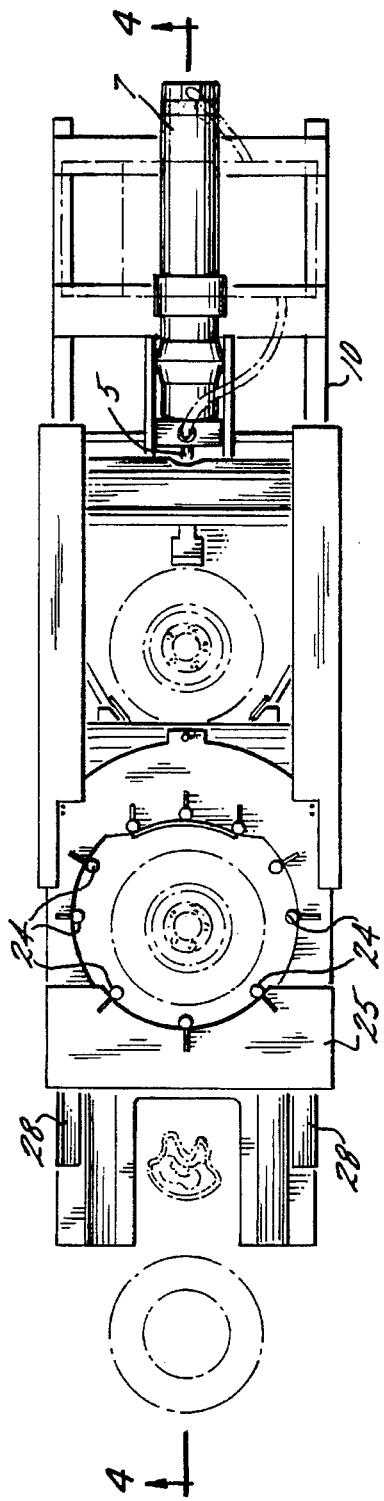
FIG. 1 is a plan view of the invention.
Figure 2:
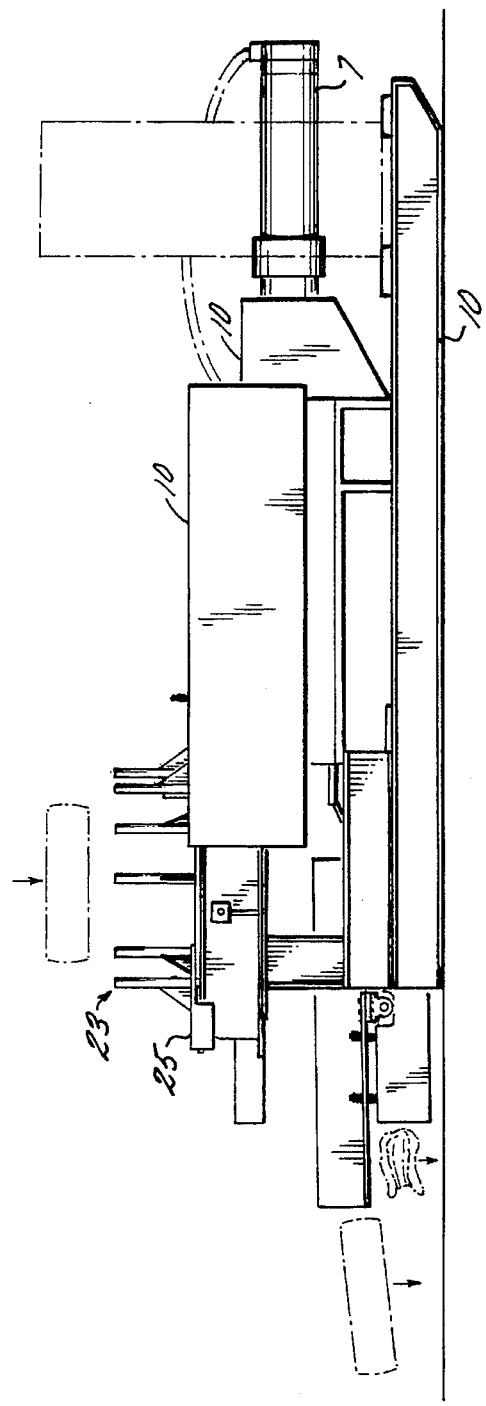
FIG. 2 is a side elevation view of the tire derimming machine.

Another function of extension arms 21 which aids in proper feeding of the tire/wheel combination is to actuate the movement of a rear section 25 of feeder rack 23. As is illustrated in FIGS. 1, 2 and 4, feeder rack 23 is separable at a rear section 25 thereof. The section 25 extends rearwardly as feeder plate 26 reaches about 4 inches from its rearmost position in the preferred embodiment, a tab 32 (FIG. 5) on at least one of the extension arms 21, catches on the rear section 25 of feeder rack 23 and urges it against the bias of at least one spring 29, and preferably two springs 29 (one on each side), to open the feeder rack rearwardly. By this operation, tires frictionally maintaining an attitude of other than horizontal will be dropped against a lower tire or the slide plate 31 in a horizontal altitude. This prevents undesirable jamming of the machine.

Referring now to FIGS. 1, 2, 3, 4 and 6, a tire and rim, having been sized reduced, travel down an inclined ramp 36 onto a shaker table 37 preferably having angled sides 38 to help keep the tire and wheel centered on the table 37 as it shakes. Shaker table 37 is preferably declined slightly from declined ramp 32 to the distal end of table 37. This aids in moving the tire and wheel downstream. Shaker table 37 most preferably also includes a cut-out 39 dimensioned such that the size reduced rim may pass through the cut-out and the tire may not. This separates the tire from the wheel and may be used to place tire and wheel on different conveyor belts for removal, in different piles or in different chutes, etc.

Shaker table 37 may be actuated by any conventional shaking means including but not limited to providing an unbalanced rod rotatably connected to the table 37 via clevis plates 40, the shaker table 37 being mounted on springs. Alternatively the table may be shaken by electromechanical means on which the table is disposed.

The invention as described herein is capable of processing roughly twice the number of tire/wheel combinations than that which apparati of the prior art are capable of processing. Moreover, the machine described herein requires only one attendant as opposed to two in the prior art, in fact, the invention could easily be modified to run without an attendant at all. It is contemplated that a conveyor belt can be constructed above feeder rack 23 to deliver tire/wheel combinations to that rack. This would effectively eliminate the need for a posted attendant. Therefore, the invention is more efficient in both amount of work accomplished and economic considerations.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A tire derimming machine comprising:
    a) an elongated frame;
    b) a single ram supported at one end of the frame;
    c) a mandrel attached to the frame said mandrel including angled and inclined plates, said plates being angled and inclined such that a tire/rim combination pushed completely therethrough by said ram is reduced in outer dimension to uncouple the tire from the rim.

2. A tire derimming machine as claimed in claim 1 wherein the single ram includes a head means having a generally vertical blade section, a generally horizontal section and at least one lateral lip section, the horizontal section being attached to the vertical blade section at a top end thereof and said lateral lip extending laterally from the blade at a trailing edge of the blade.

3. A tire derimming machine as claimed in claim 1 wherein the ram has a stroke of from about 40 inches to about 60 inches.

4. A tire derimming machine as claimed in claim 1 wherein the ram has a stroke of about 50 inches.

5. A tire derimming machine as claimed in claim 1 wherein the frame comprises at least a mounting plate having sufficient structural integrity to withstand forces generated by the ram urging the tire/rim combination against and through the mandrel.

6. A tire derimming machine as claimed in claim 1 wherein the angle between the two plates of the mandrel measured from a centerline of the machine is from about 20° to about 70°.

7. A tire derimming machine as claimed in claim 6 wherein said plates are also inclined such that top edges of the plates are closer to one another than bottom edges of the plates.

8. A tire derimming machine as claimed in claim 7 wherein the incline is from about 1° to about 10°.

9. A tire derimming machine as claimed in claim 1 wherein the mandrel includes means for preventing the tire/rim combination from rising above the mandrel.

10. A tire derimming machine as claimed in claim 1 wherein the tire derimming machine further includes automatic feeder means for feeding the tire/rim combination to the mandrel and ram.

11. A tire derimming machine as claimed in claim 10 wherein the automatic feeder means includes a rack wherein tire/rim combinations are placed horizontally atop one another.

12. A tire derimming machine as claimed in claim 11 wherein the automatic feeder means further includes a reciprocating plate for transporting one tire/rim combination at a time to a size reduction zone between the rim and the mandrel.

13. A tire derimming machine as claimed in claim 12 wherein the reciprocating plate comprises an elongated shape having a frontal region and a body region, said frontal region being adapted to loading and transporting a single tire/rim combination to the size reduction zone.

14. A tire derimming machine as claimed in claim 13 wherein the frontal region further includes a plan view shape approximating an outer arc of the tire/rim combination.

15. A tire derimming machine as claimed in claim 14 wherein the frontal region further includes a declined plane declining toward and tangential to the plan view shape approximating an outer arc of the tire/rim combination.

16. A tire derimming machine as claimed in claim 12 wherein the rack includes an extendible rear section biased into the resting position by at least one spring, said extendible rear section being extended when a tab on at least one extension arm extending between a cross brace connected to the ram and the feeder plate contacts a contact point on the extendible rear section, said rear section being extendible a sufficient distance to promote proper orientation of tire/rim combinations.

17. A tire derimming machine as claimed in claim 1 further including a size reduced rim and tire separating means.

18. A tire derimming machine as claimed in claim 17 wherein the separating means comprises a planar surface having an elongate cut-out in one end thereof distal from the mandrel said planar surface being operatively connected to a means for shaking the planar surface.

19. A tire derimming machine as claimed in claim 18 the means for shaking is a shaft having a weight mounted thereon in an off center position said shaft being rotatingly connected to the planar surface and connected to a drive means, said planar surface being resiliently mounted whereby the surface oscillates with the rotation of the off-balance movement of the shaft.

20. A tire derimming machine as claimed in claim 1 wherein said mandrel further includes replaceable wear plates removably attached to the mandrel plates to extend machine life.

21. A tire derimming machine comprising:
    a) an elongated frame;
    b) a single ram supported at one end of the frame;

c) a mandrel having converging plates mounted centrally on said frame said plates converging in the direction of forward stroke of the ram on an angle in the range of about 30° to about 50°, said plates being wider at a mouth thereof and narrower at a throat thereof said throat being located in an area of said frame of about a point at which the forward stroke of the ram ends;

d) a feeder rack supported on said frame section kitty corner to and above said mandrel said feeder rack having a diameter sufficient to accept a tire/wheel combination, said feeder rack being disposed immediately above a feeder plate operatively attached to said ram such that said ram imparts to said feeder plate a reciprocating movement in an axial direction along said frame, said feeder plate reciprocating out from under a tire/wheel combination in the feeder rack such that a tire/wheel combination is transported to the mandrel upon the feeder plate cycling back to its start position; and e) a shaker table resiliently mounted on said frame and extending from said mandrel in a direction away from the end of the frame supporting the ram, said shaker table being operatively connected to a shaking means and including a cut out at an end of the shaker table distal from the end proximate the mandrel;

whereby said ram urges a tire/wheel combination through said mandrel while leading a sequentially, additional tire/wheel combination from said feeder rack to said feeder plate to said mandrel to said shaker table whereon said tire and wheel are separated.

22. A tire derimming machine comprising:

a) an elongated frame;

b) a ram supported at one end of said frame, said ram having a head;

c) two guide plates supported by said elongated frame said guide plates being positioned one on either side of a centerline of said elongated frame, each plate having a first end and a second end said first ends of said plates being located at a greater distance from said centerline than said second ends of said plates such that said plates, in combination, form a throat which constricts in a direction of forward ram movement, said ram extending from a non-extended position to a telescoped position wherein said head of said ram extends beyond a first plane defined by said first ends of said plates and beyond a second plane defined by said second ends of said plates thus forcing a tire and rim combination to reduce size and pass through said second plane of said plates.

* * * * *